June 12, 1956  W. F. M. GRAY  2,750,474
MAGNETIC ACTUATING MECHANISM
Filed March 28, 1955  2 Sheets-Sheet 1
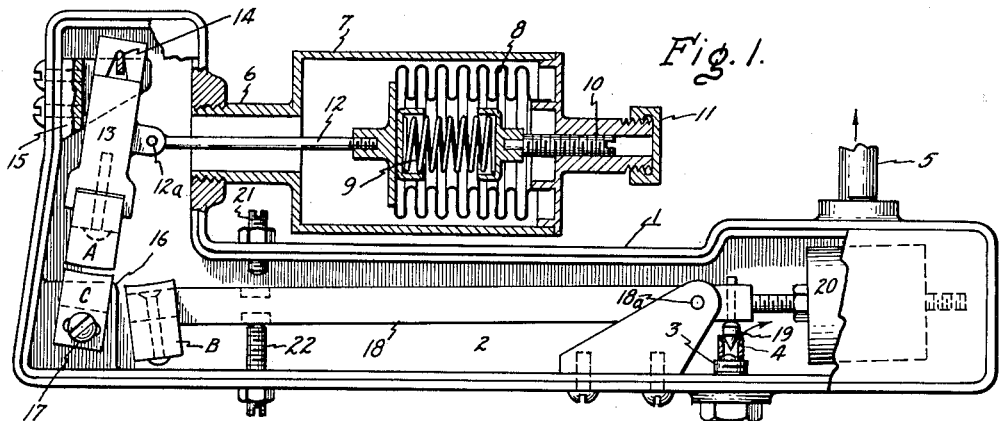
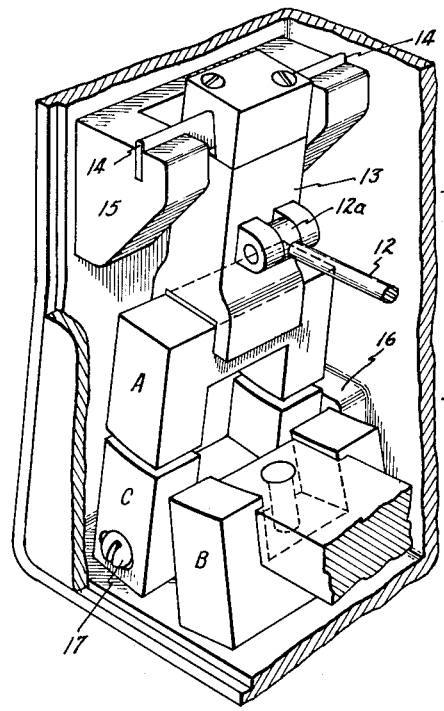
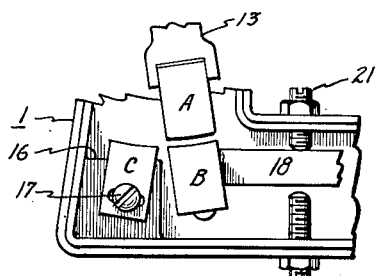
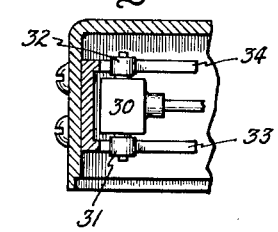
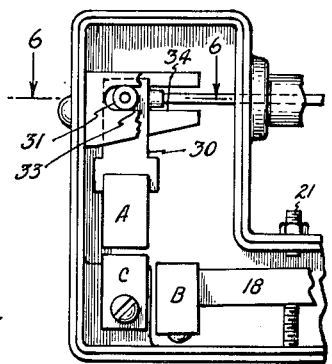
Inventor
Willard F. M. Gray
by Gilbert P. Tarlton
His Attorney.

June 12, 1956 W. F. M. GRAY 2,750,474
MAGNETIC ACTUATING MECHANISM
Filed March 28, 1955 2 Sheets-Sheet 2
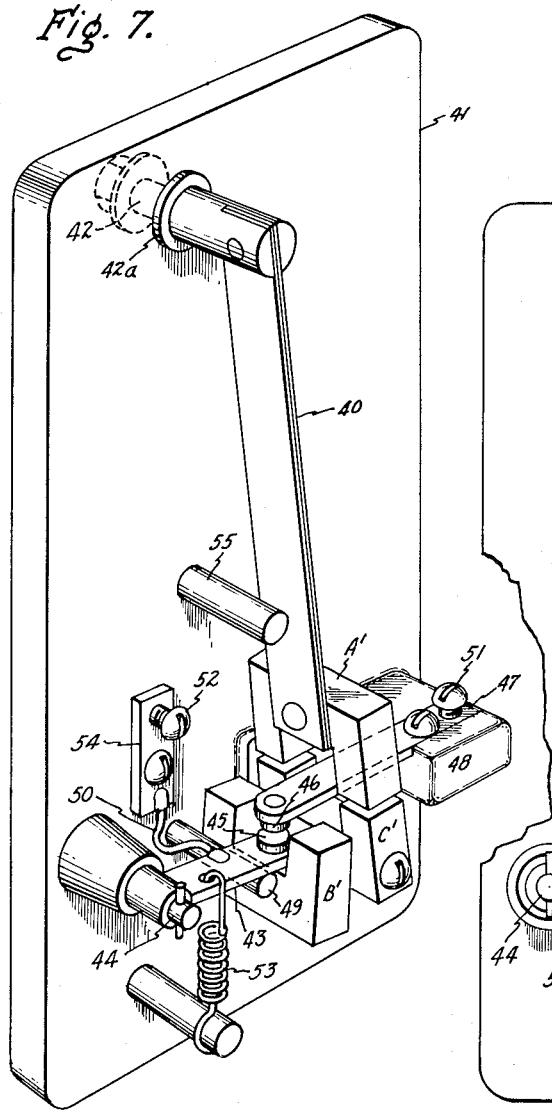
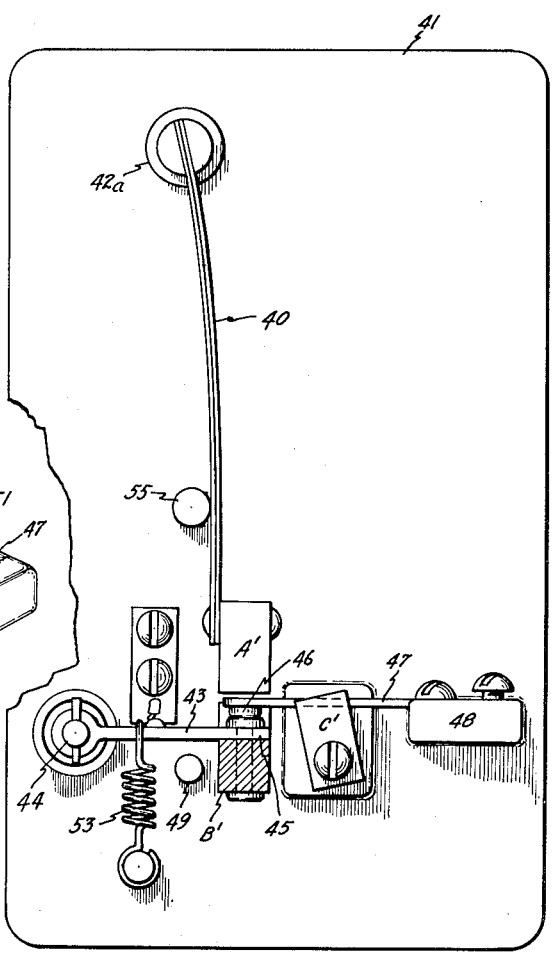
Inventor
Willard F. M. Gray,
by Gilbert P. Tarleton
His Attorney.

United States Patent Office 2,750,474
Patented June 12, 1956

2,750,474

MAGNETIC ACTUATING MECHANISM

Willard F. M. Gray, Pittsfield, Mass., assignor to General Electric Company, a corporation of New York Application March 28, 1955, Serial No. 496,993

16 Claims. (Cl. 200—138)

The present invention relates to actuating mechanisms, and more particularly to actuating mechanisms adapted for operating devices such as valves and switches in response to variations in pressure and temperature.

It is an object of the present invention to provide a magnetically operated actuating mechanism for producing snap-action in the opening and closing movement of valves, electrical switches and the like, and wherein the actuating mechanism sensitively responds to variations in a quantity or condition such as pressure or temperature.

It is another object of the invention to provide in a pressure responsive device a valve structure and actuating mechanism therefor wherein the valve controls a supply of fluid under pressure and opens and closes with a snap-action in response to slight variations in pressure.

It is still another object of the invention to provide a thermostatically operated electrical switch device which incorporates a magnetically operated snap-acting actuating mechanism responsive to small variations in temperature conditions.

Other objects and advantages will become apparent from the following description and the appended claims.

In its broad aspects, the actuating mechanism of the present invention comprises a set of three permanent magnets one of which is stationary and the other two of which are movable, one of the movable magnets being associated with a valve mechanism or other control device while the other movably mounted magnet is connected to and movable by a condition responsive device, the arrangement being such that upon movement of the one movable magnet in response to variations in said condition, the other movable magnet operates the valve or other control element with a snap-action closing or opening movement, depending on whether the movement of the one movable magnet is into or out of the field of attraction of the other movable magnet.

In one embodiment of the invention, the one movable magnet may be secured to a sealed metallic bellows which contracts or expands in response to pressure variations in a pressure chamber. In another embodiment of the invention, the one movable magnet is associated with a bimetallic or other temperature responsive member for actuating a contact associated with the other movable magnet for making and breaking a circuit to electrically operate a cooling or heating device, depending on the results sought.

The invention will be better understood from the following description when taken in conjunction with the accompanying drawings in which:

Fig. 1 is a view in elevation partly in section of a preferred embodiment of the invention in a valve device;

Fig. 2 is an enlarged detailed view of the magnetic actuating mechanism shown in Fig. 1;

Fig. 3 is a view similar to Fig. 2 showing the magnet arrangement in a different operating position;

Fig. 4 is a view showing a modification of the magnet arrangement of Fig. 1;

Fig. 5 is an elevational view showing another modification of the magnet arrangement;

Fig. 6 is a plan view taken along the line 6—6 of Fig. 5;

Fig. 7 is a perspective view of another embodiment of the invention incorporated in an electrical thermostat arrangement; and Fig. 8 is a front view of the Fig. 7 embodiment showing the magnet arrangement in a different operating position.

Referring now to the drawings, and particularly to Fig. 1, there is shown a casing 1 having an inlet chamber 2 into which extends gas inlet 3 having a valve seat 4. Outlet 5 of inlet chamber 2 serves to conduct gas under pressure to any apparatus or container (not shown), such as a gas filled or gas containing transformer, in which it is desired to maintain the gas at a predetermined pressure. Communicating with inlet chamber 2 through a fluid tight connection 6 is a pressure chamber 7 in which is mounted a sealed, expansible metallic bellows 8 urged into expanded condition by a spring 9. The tension applied by the spring 9 to bellows 8 is adjustable as desired by means of adjusting screw 10, which is accessible from the outside by removing threaded cap 11.

Bellows 8 is connected by means of rod 12 and pivot connection 12a to the swingable support member 13 carrying at its lower end a permanent magnet A and pivotally mounted at its upper end on knife-edge 14, the latter being fixedly held on bracket 15 secured to the wall of casing 1, as more clearly shown in Fig. 2. Permanent magnet C is fixedly mounted on a boss 16 in casing 1 by screw 17 or other suitable means, in such manner that magnet A in position directly above magnet C has its pole portions respectively opposite those of magnet C which are of opposite polarity and an air gap is provided between the two magnets.

Pivotally mounted at fulcrum 18a in casing 1 is a lever arm 18 having mounted at one end thereof a valve 19 adapted to fit in pressure-tight engagement in valve seat 4, and having a permanent magnet B at its opposite end. Lever arm 18 is further equipped with an adjustable counterweight 20, and adjustable stops 21, 22 are provided on casing 1 for limiting the range of movement of lever arm 18.

In the operation of the device described, when the gas pressure in casing 1, and therefore in chamber 7 and the device supplied by outlet 5, is below a predetermined level, bellows 8 is in the expanded position holding magnet A in the inoperative position shown in Figs. 1 and 2, which allows magnet B to drop and thereby open the valvet 19 at inlet 3. Under these conditions, gas under pressure is delivered to chambers 2 and 7 through inlet 3, the increased pressure forcing bellows 8 into a contracted position, which in turn moves magnet A slowly to a position over magnet B as shown in Fig. 3, wherein magnet A also has its pole portions respectively opposite those of magnet B which are of opposite polarity. In this position, magnet B is attracted toward magnet A, thus moving valve 19 into closed position shutting off the gas supply at the inlet 3. It will be noted that stop 21 is so adjusted that with valve 19 in closed position in seat 4, magnet B is still spaced an appreciable distance from the pole face of magnet A. It is evident from the described arrangement that magnets B and C have their poles of like polarity adjacent each other.

It has been found that instead of producing a gradual upward movement of magnet B, the slow movement of magnet A to a position over magnet B caused a sudden rapid movement of magnet B toward magnet A when a certain point had been reached during magnet A's movement. This snap-action was found to increase in accordance with the amount of force biasing magnet B in the direction away from magnet A, e. g., the pressure exerted by the gas supply on valve 19 tending to keep it in the open position. As a result of the snap-action thus produced, a quick fluid-tight shut-off at the valve is provided. This positive and rapid closing action avoids the channelling and bleeding effects which often accompany slow valve actions due to prolonged high pressure flow of gas along the valve parts through a slowly narrowing orifice, and the snap movement of the valve also results in a desirable self-cleaning action.

As the gas pressure in chambers 2 and 7 begins to drop, bellows 8 gradually expands under the action of spring 9, thus moving magnet A slowly away from magnet B and into the field of magnet C. Here also a snap-action is observed in the drop of magnet B causing a quick opening of valve 19 when magnet A reaches a certain point in its path of movement toward magnet C.

Fig. 4 shows a modification of the device wherein an auxiliary magnet D is pivotally mounted on the outside of casing 1 to provide for operation of the actuating mechanism under a higher range of pressure conditions. By manually moving magnet D into the operating position shown in solid lines in Fig. 4, a greater attracting force is provided on magnet A opposing the contracting action of bellows 8. Hence, a greater pressure of the gas in pressure chamber 7 is required to move magnet A into position over magnet B in order to close valve 19. The mounting of magnet D may be such that once magnet A is in position over magnet B, magnet D automatically drops back to its inoperative position shown in broken lines in Fig. 4 and thus allows the valve to function at its normal lower pressure range, or if desired the mounting of magnet D may be such that it requires manual movement into both operative and inoperative positions.

Figs. 5 and 6 show a modification of the device shown in Fig. 1 wherein magnet A instead of being swingably mounted on a knife-edge is supported by a member 30 on which rollers 31, 32 are journalled for horizontal movement along tracks 33, 34. In this embodiment, magnet A moves in substantially a straight line over magnets B and C and the pole faces of the magnets are preferably cut straight, in contrast with the Fig. 1 arrangement in which the pole faces are preferably curved as shown, in view of the arc-like movement of magnet A.

While a spring 9 is shown in Fig. 1 for the purpose of constantly urging bellows 8 into an expanded position, it will be understood that the bellows itself may have a sufficient resilient action similar to that of the spring, and the spring 9 may, therefore, be dispensed with in suitable cases.

A further form of the invention is shown in Figs. 7 and 8 wherein the magnetic actuating mechanism is embodied in an electrical thermostatic switch control. As shown in these figures, a bimetallic temperature responsive member 40 of known construction is mounted on a suitable support 41 by means of a shaft 42, a friction washer 42a being provided which frictionally hold the bimetallic member 40, and consequently the magnet A' attached at its lower end, in a suitable position such as shown in Fig. 7. Magnet C' is fixedly mounted on support 41, while magnet B' is pivotally mounted on metallic lever 43 for movement about pivot 44 which is mounted on support 41, stop member 49 being provided to limit the drop of magnet B'. The poles of the magnets in this embodiment have the same relative arrangement as described above. Switch contact 45 is mounted on lever 43 in the vicinity of magnet B' for movement toward and away from contact 46 stationarily mounted on insulating block 48 by means of conducting bar 47, block 48 being fixed to support 41. A binding post 51 is provided at the fixed end of bar 47.

Lever 43 is preferably urged in a clockwise direction by means of a spring 53 in order to bias contact 45 and magnet B' in a direction away from contact 46 so as to provide the snap-action opening and closing movements as explained above in connection with the device of Fig. 1, spring 53 in this case functioning in the manner of the gas under pressure which urges the valve 19 (Fig. 1) into open position. Alternative means for producing such bias may be used if desired, such as by weighting magnet B' to a suitable degree. Flexible conducting lead 50 connects lever 43 to a terminal block 54 having a binding post 52.

Fig. 8 is a front view of the device shown in Fig. 7, and shows magnet A' swung into position over magnet B' to bring the contacts 45, 46 together in circuit-making position. Stop 55 is preferably provided to limit the clockwise movement of member 40 to the position shown in Fig. 8.

In the operation of the device of Figs. 7 and 8, as a thermostatic control for a heating apparatus, the terminals of a circuit including an electrically operated heating unit (not shown) are connected to the respective binding posts 51, 52. In the open switch position shown in Fig. 7, the ambient temperature is at a sufficiently high level to maintain bimetallic element 40 in the illustrated position. As the ambient temperature drops, bimetallic element 40 gradually changes in longitudinal curvature in the manner known in the art so as to gradually move magnet A' toward a position directly over but spaced from magnet B'. During the movement of magnet A', magnet B' is suddenly attracted and moves by snap-action toward magnet A', thus bringing contacts 45, 46 together into circuit-making position for actuating the heating unit to provide additional heat. The arrangement of contacts 45, 46 and magnets A' and B' is such that the latter magnets are spaced apart by an air gap when the contacts 45, 46 engage each other, in a manner similar to that shown in Fig. 3 where the spacing is produced by the stop 21. In this way, very little hindrance is presented to the movement of magnet A' along its path between magnets B' and C', thus making for an extremely sensitive thermostat action. As soon as the ambient temperature is sufficiently high, bimetallic element 40 returns to its original position as shown in Fig. 7, thus breaking the electrical contact and interrupting the operation of the heating unit. A significant feature of the illustrated arrangement is the location of contacts 45 and 46 adjacent magnet B' and in the magnetic field thereof, which permits extinguishing by magnetic action the arc which may be formed during the separation of contacts 45, 46.

As will be readily understood, substantially the same arrangement can be used to electrically actuate a refrigerating unit for cooling purposes, instead of a heating unit, it being necessary only to use the proper bimetallic element or to suitably arrange the bimetallic member already described.

The present invention provides an improved actuating mechanism wherein the controlling and controlled parts are not directly mechanically connected and which thereby avoids damage to the parts due, for example, to excess pressure, and keeps wear of the parts to a minimum even under prolonged operation. The response of the actuating mechanism to variable conditions such as temperature and pressure is considerably more sensitive over a wide range of such operating conditions than prior devices used for similar purposes. For example, a valve actuating mechanism of the type shown in Fig. 1 serves efficiently to handle high pressure supply variations from 200–3000 pounds per square inch and to regulate these pressures within a range of from ½ to 2 p. s. i. Similarly, in the case of the thermostatic control, the lack of hindrance to the movement of magnet A' provides for the movement of the bimetallic element directly in accordance with the changes in temperature, and accordingly, the circuit-making and breaking connections are achieved in response to slight variations in temperature. This action is in contrast to known types of magnetically actuated thermostats where a considerable force is required to separate the contact members held together by magnets of opposite polarity which are adjacent to or in direct contact with each other.

The embodiments of the device illustrated in the drawings incorporate permanent magnets of the horseshoe type. However, if desired, other types of magnets could be used in accordance with the invention, such as permanent bar magnets and electromagnets operated by alternating or direct current.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the foregoing disclosure.

What I claim as new and desire to secure by Letters Patent of the United States is:

1. An actuating mechanism, comprising, in combination, support means; a first magnet having a pole portion of given polarity and mounted on said support means for movement of said pole portion along a predetermined path between a first and a second position; a second magnet fixedly mounted on said support means and having a pole portion of polarity opposite said given polarity arranged adjacent said predetermined path so as to be opposite and spaced from the pole portion of said first magnet when the latter is in its first position; and a third magnet having a pole portion of polarity opposite said given polarity arranged adjacent said second magnet and displaced therefrom along said predetermined path, said third magnet being mounted on said support means for movement between a forward position with its pole portion adjacent said predetermined path so as to be spaced from and opposite the pole portion of said first magnet with the latter in its second position, and a rearward position slightly away from said predetermined path, said third magnet being constantly urged toward its rearward position and moving by the force of attraction exerted by said first magnet into its forward position in opposition to said constant rearward urging during movement of said first magnet from its first toward its second position, and being moved by said constant rearward urging into its rearward position during the return movement of said first magnet.

2. An actuating mechanism comprising, in combination, support means; a first magnet having a pole face of given polarity and mounted on said support means for movement of said pole face along a predetermined path between a first and a second position; a second magnet fixedly mounted on said support means and having a pole face of polarity opposite said given polarity arranged adjacent said predetermined path so as to be opposite and spaced from the pole face of said first magnet when the latter is in its first position; and a third magnet having a pole face of polarity opposite said given polarity arranged adjacent said second magnet on the same side of said predetermined path and displaced therefrom along said predetermined path, said third magnet being mounted on said support means for movement between a forward position with its pole face adjacent said predetermined path so as to be spaced from and opposite the pole face of said first magnet with the latter in its second position, and a rearward position slightly away from said predetermined path, said third magnet being constantly urged toward its rearward position and moving suddenly by the force of attraction exerted by said first magnet into its forward position in opposition to said constant rearward urging during movement of said first magnet from its first toward its second position, and being moved suddenly by said constant rearward urging into its rearward position during the return movement of said first magnet.

3. An actuating mechanism comprising, in combination, support means; a first magnet having a pole face of given polarity and mounted on said support means for movement of said pole face along a predetermined path between a first and a second position; a second magnet fixedly mounted on said support means and having a pole face of polarity opposite said given polarity arranged adjacent said predetermined path so as to be opposite and spaced from the pole face of said first magnet when the latter is in its first position; a third magnet having a pole face of polarity opposite said given polarity arranged adjacent said second magnet on the same side of said predetermined path and displaced therefrom along said predetermined path, said third magnet being mounted on said support means for movement between a forward position with its pole face adjacent said predetermined path so as to be spaced from and opposite the pole face of said first magnet with the latter in its second position and a rearward position slightly away from said predetermined path; and means urging said third magnet toward its rearward position, said third magnet suddenly moving by the force of attraction exerted by said first magnet into its forward position in opposition to said rearward urging means during movement of said first magnet from its first toward its second position, and being suddenly moved by said urging means into its rearward position during the return movement of said first magnet.

4. An actuating mechanism comprising, in combination, support means; a first magnet having a pole portion of given polarity and mounted on said support means for movement of said pole portion along a predetermined path between a first and a second position; means responsive to variable ambient conditions to be controlled and operatively associated with said first magnet for moving said first magnet in accordance with variations in said ambient conditions; a second magnet fixedly mounted on said support means and having a pole portion of polarity opposite said given polarity arranged adjacent said predetermined path so as to be opposite and spaced from the pole portion of said first magnet when the latter is in its first position; a third magnet having a pole portion of polarity opposite said given polarity arranged adjacent said second magnet and displaced therefrom along said predetermined path, said third magnet being mounted on said support means for movement between a forward position with its pole portion adjacent said predetermined path so as to be spaced from and opposite the pole portion of said first magnet with the latter in its second position, and a rearward position slightly away from said predetermined path, said third magnet being constantly urged toward its rearward position and moving suddenly by the force of attraction exerted by said first magnet into its forward position in opposition to said constant rearward urging during movement of said first magnet from its first toward its second position, and being moved suddenly by said constant rearward urging into its rearward position during the return movement of said first magnet; and means operable by said third magnet for regulating the variable ambient conditions acting on said responsive means.

5. A pressure responsive valve mechanism comprising, in combination, casing means defining a chamber therein; pressure responsive means in said chamber movable in accordance with variations in pressure in said chamber; inlet means for supplying fluid under pressure to said chamber; outlet means for discharge of the fluid under pressure from said casing means; shut-off valve means at said inlet means and movable between opening and closing positions for controlling the supply of fluid under pressure to said chamber of said casing means; a first magnet having a pole face of given polarity and operably associated with said pressure responsive means for movement of said pole face along a predetermined path between a first and a second position; a second magnet fixedly mounted on said casing means and having a pole face of polarity opposite said given polarity arranged adjacent said predetermined path so as to be opposite and spaced from the pole face of said first magnet when the latter is in its first position; and a third magnet having a pole face of polarity opposite said given polarity arranged adjacent said second magnet and displaced therefrom along said predetermined path, said third magnet being operably associated with said shut-off valve means and movable between a forward position with its pole face adjacent said predetermined path so as to be spaced from and opposite the pole face of said first magnet with the latter in said second position, and a rearward position slightly away from said predetermined path, said third magnet being constantly urged toward its rearward position and moving suddenly by the force of attraction exerted by said first magnet into its forward position in opposition to said constant rearward urging during movement of said first magnet from its first toward its second position for quickly moving said shut-off valve means into one of said opening and closing positions thereof, and being moved suddenly by said constant rearward urging into its rearward position during the return movement of said first magnet for quickly moving said shut-off valve means into the other of its positions.

6. A pressure responsive valve mechanism comprising, in combination, casing means defining a chamber therein; pressure responsive bellows means in said chamber movable in accordance with variations in pressure in said chamber; inlet means for supplying gas under pressure to said chamber; outlet means for discharge of the gas under pressure from said casing means; shut-off valve means at said inlet means and movable between opening and closing positions for controlling the supply of gas under pressure to said chamber of said casing means; a first magnet having a pole face of given polarity and operably associated with said pressure responsive bellows means for movement of said pole face along a predetermined path between a first and a second position; a second magnet fixedly mounted on said casing means and having a pole face of polarity opposite said given polarity arranged adjacent said predetermined path so as to be opposite and spaced from the pole face of said first magnet when the latter is in its first position; and a third magnet having a pole face of polarity opposite said given polarity arranged adjacent said second magnet and displaced therefrom along said predetermined path, said third magnet being operably associated with said shut-off valve means and movable therewith between a forward position with its pole face adjacent said predetermined path so as to be spaced from and opposite the pole face of said first magnet with the latter in said second position, and a rearward position slightly away from said predetermined path, said third magnet being constantly urged toward its rearward position by the force of the gas under pressure at said inlet means tending to open said valve means and moving suddenly by the force of attraction exerted by said first magnet into its forward position in opposition to said constant rearward urging during movement of said first magnet from its first toward its second position for quickly moving said shut-off valve means into its closing position, and being moved suddenly by said constant rearward urging into its rearward position during the return movement of said first magnet for quickly moving said shut-off valve means into its open position.

7. A mechanism as defined in claim 6, wherein said third magnet and said shut-off valve means are mounted at opposite ends of a lever member, said lever member being pivotally mounted between its ends on said casing.

8. A mechanism as defined in claim 7, wherein said first magnet is swingably mounted in said casing.

9. A mechanism as defined in claim 7, wherein said first magnet is rollably mounted in said casing.

10. An actuating mechanism comprising, in combination, support means; a first magnet having a pole face of given polarity and mounted on said support means for movement of said pole face along a predetermined path between a first and a second position; a second magnet fixedly mounted on said support means and having a pole face of polarity opposite said given polarity arranged adjacent said predetermined path so as to be opposite and spaced from the pole face of said first magnet when the latter is in its first position; a third magnet having a pole face of polarity opposite said given polarity arranged adjacent said second magnet on the same side of said predetermined path and displaced therefrom along said predetermined path, said third magnet being mounted on said support means for movement between a forward position with its pole face adjacent said predetermined path so as to be spaced from and opposite the pole face of said first magnet with the latter in its second position, and a rearward position, and a rearward position slightly away from said predetermined path, said third magnet being constantly urged toward its rearward position and moving suddenly by the force of attraction exerted by said first magnet into its forward position in opposition to said constant rearward urging during movement of said first magnet from its first toward its second position, and being moved suddenly by said constant rearward urging into its rearward position during the return movement of said first magnet; and an auxiliary magnet movable between an operative position in proximity to said first magnet and an inoperative position away from said first magnet, said auxiliary magnet being operable in its operative position to influence the force required to move said first magnet along said predetermined path.

11. A thermotsatic actuating mechanism comprising, in combination, support means; temperature responsive means mounted on said support means and movably in accordance with variations in ambient temperature; a first magnet having a pole face of given polarity and operatively associated with said temperature responsive means for movement of said pole face along a predetermined path between a first and a second position; a second magnet fixedly mounted on said support means and having a pole face of polarity opposite said given polarity arranged adjacent said predetermined path so as to be opposite and spaced from the pole face of said first magnet when the latter is in its first position; a third magnet having a pole face of polarity opposite said given polarity arranged adjacent said second magnet and displaced therefrom along said predetermined path, said third magnet being mounted on said support means for movement between a forward position with its pole face adjacent said predetermined path so as to be spaced from and opposite the pole face of said first magnet with the latter in its second position, and a rearward position slightly away from said predetermined path, said third magnet being constantly urged toward its rearward position and moving suddenly by the force of attraction exerted by said first magnet into its forward position in opposition to said constant rearward urging during movement of said first magnet from its first toward its second position, and being moved suddenly by said constant rearward urging into its rearward position during the return movement of said first magnet; stationary electrical contact means mounted on said support means; and movable electrical contact means associated with said third magnet for movement therewith between a circuit-making position in engagement with said stationary electrical contact means and a circuit-breaking position out of engagement with said stationary electrical contact means.

12. A mechanism as defined in claim 11, wherein said third magnet and said movable electrical contact means are mounted at one end of a lever member, said lever member being pivotally connected at its other end to said support means.

13. A mechanism as defined in claim 12, wherein resilient means are arranged between said lever member and said support means for constantly urging said third magnet toward its rearward position.

14. A mechanism as defined in claim 11, wherein said temperature responsive means is an elongated bimetallic member secured at one end to said support means and having said first magnet secured at its opposite free end.

15. A mechanism as defined in claim 11, wherein said third magnet is a horseshoe magnet and said movable electrical contact means is arranged substantially between the poles of said horseshoe magnet.

16. A mechanism as defined in claim 2, wherein all of said magnets are horseshoe magnets, said second and third magnets having their like poles adjacent each other and said first magnet in its first and second positions having its pole faces facing unlike poles of said second and third magnets, respectively.

References Cited in the file of this patent

UNITED STATES PATENTS

| | | |
|---|---|---|
| 2,555,571 | Chisholm | June 5, 1951 |
| 2,575,086 | Atchison | Nov. 13, 1951 |
| 2,577,165 | Thorsheim | Dec. 4, 1951 |
| 2,671,834 | Kmiecik | Mar. 9, 1954 |